United States Patent [19]

McDonald

[11] 4,343,342

[45] Aug. 10, 1982

[54] UNIFIED MODULAR INDICIA MARKING FOR RUBBER ARTICLES

[75] Inventor: Peter McDonald, Hudson, Ohio

[73] Assignee: The Firestone Tire & Rubber Company, Akron, Ohio

[21] Appl. No.: 247,454

[22] Filed: Mar. 25, 1981

[51] Int. Cl.³ ............................................. B60C 13/00
[52] U.S. Cl. ............................. 152/353 R; D12/152; 40/587
[58] Field of Search .......... 152/353 R, 353 C, 353 G, 152/352 R, 352 A, 330; D12/152; 40/587; 156/116

[56] References Cited

U.S. PATENT DOCUMENTS

| | | | |
|---|---|---|---|
| D. 122,250 | 9/1940 | Allen . | |
| D. 124,204 | 12/1940 | Rideout | D12/15 |
| D. 186,095 | 9/1959 | Balmer et al. | D90/20 |
| D. 207,379 | 4/1967 | Jones et al. | D90/20 |
| D. 222,216 | 10/1971 | Overstreet et al. | D12/15 |
| 1,458,629 | 6/1923 | Raymond | 152/353 R |
| 1,576,156 | 3/1926 | Swoboda | 152/353 R |
| 1,784,118 | 12/1930 | Smithers | 152/353 R |
| 2,679,277 | 5/1954 | Gray | 152/353 R |
| 3,518,335 | 6/1970 | Jablonski | 264/93 |
| 3,638,704 | 2/1972 | Boileau | 152/353 R |
| 3,663,328 | 5/1972 | Turoczi, Jr. | 152/353 R |
| 4,198,774 | 4/1980 | Roberts et al. | 152/353 R |

*Primary Examiner*—Edward C. Kimlin
*Assistant Examiner*—Lois E. Boland
*Attorney, Agent, or Firm*—Ernst H. Ruf

[57] ABSTRACT

A pneumatic tire having indicia markings on each of its two sidewall surfaces contained within a plurality of sequentially adjacent modules forming a segmented annular band concentric with the tire sidewall. The modules on one sidewall surface are preferably located radially outwardly while the plurality of modules on other sidewall surface are located substantially radially inwardly of the tire maximum section width. The modules may be defined by a pair of circumferential projections, segmented via substantially radial projections, with these projections taking the form of raised ribs or recessed grooves. In a further embodiment of this invention, the modules are either embossed or debossed relative to the bases of the tire sidewall surfaces.

15 Claims, 9 Drawing Figures

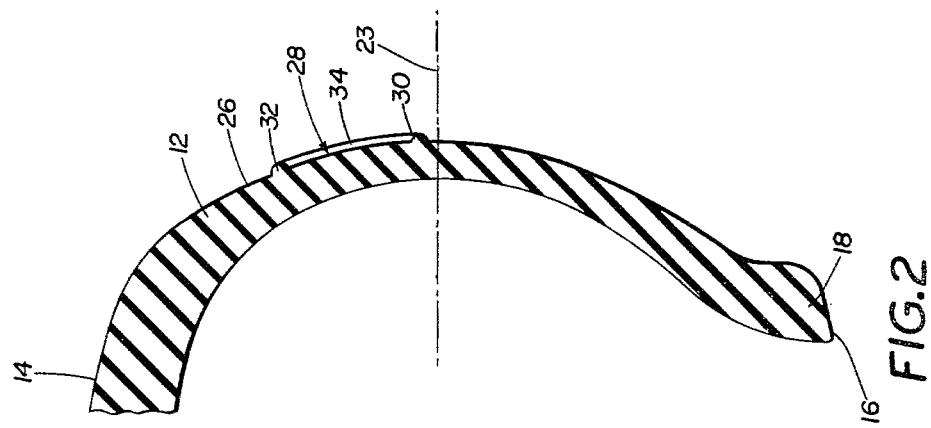
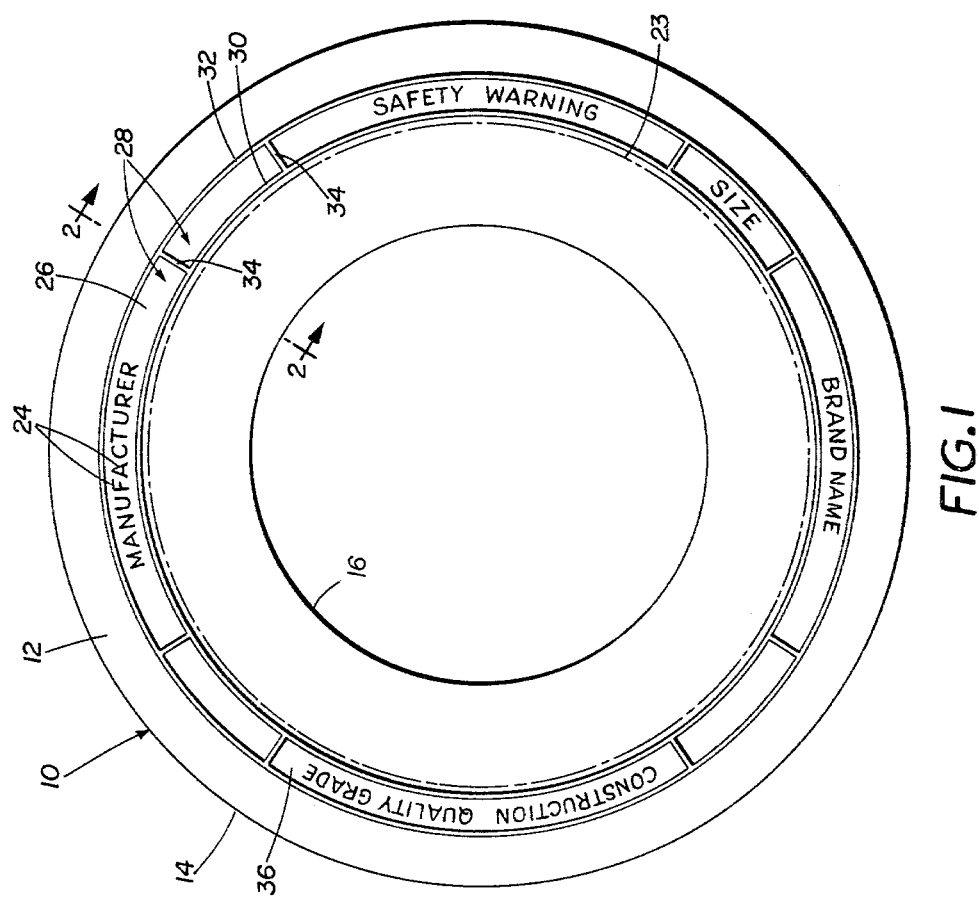

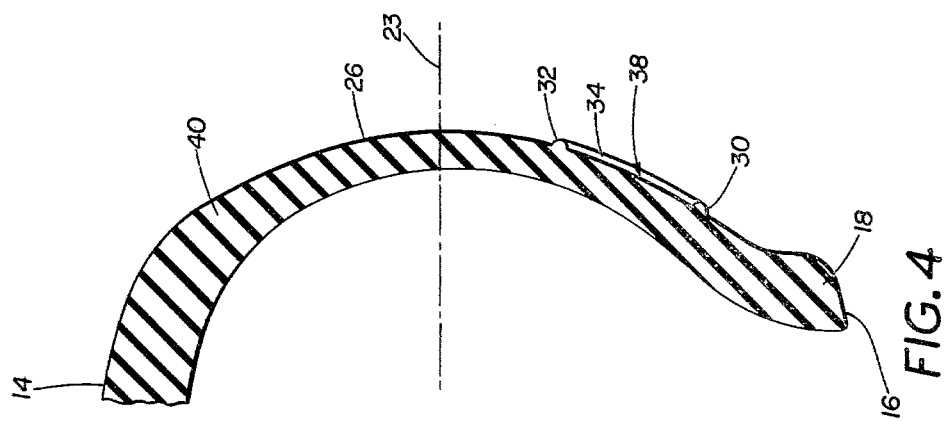
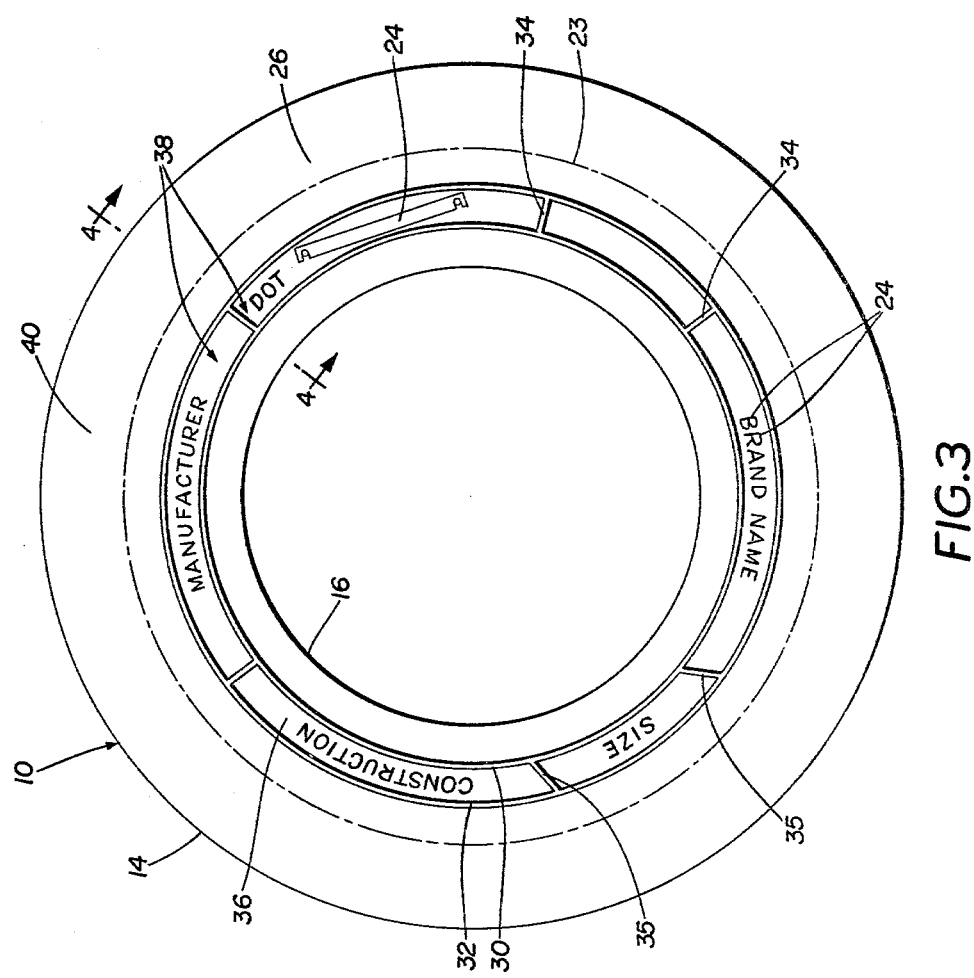

UNIFIED MODULAR INDICIA MARKING FOR RUBBER ARTICLES

TECHNICAL FIELD

The field of art to which this invention pertains is that of molded rubber articles, particularly to modular indicia marking on the sidewalls of pneumatic tires.

For many years, tire manufacturers have placed indicia, i.e., letters, numerals, characters, symbols, trademarks or similar designations and descriptions, upon the sidewalls of tires for a variety of purposes. While these indicia may also enhance the appearance and thus the marketability of their products, the main reason for adding these indicia is for informational and identification purposes.

Such indicia markings or units of information may take a variety of forms and convey information relative to the tire manufacturer, the brand name of the tire, the tire size, its construction and load limits, the quality grade thereof, sizes, mounting instructions, safety warnings, as well as the place and date of its manufacture. This sometimes bewildering amount of information must be added to the tire sidewall areas, often in conformance with U.S. Department of Transportation requirements, at a location and in a manner so as to be beneficial not only to the ultimate consumer but also to aid in the inspection, inventory and warehouse functions prior to their sale to the ultimate user. Often these units of information are not placed on the tire sidewall in an organized manner thus impairing the usefulness of the information to the manufacturer, seller and customer.

BACKGROUND ART

U.S. Pat. No. 1,458,629 to Raymond discloses a tire having a sidewall with two parallel circumferential ribs and nomenclature in the space therebetween, with the ribs serving to prevent obliteration of the nomenclature. Similarly, U.S. Pat. No. 1,576,156 to Swoboda discloses a tire having nomenclature on each sidewall, with the purpose of the nomenclature being for identification.

U.S. Pat. No. 2,679,277 to Gray discloses a tire having nomenclature, in the form of identifying projections, on the sidewall above the maximum section width so as to provide the information at a position where it is least susceptible to multilation.

DISCLOSURE OF THE INVENTION

The present invention provides a solution to the prior art problems pertaining to the unorganized arrangement of information on tire sidewalls. The solution includes having the required or desired indicia markings, on each of the two sidewalls of the tire, contained within a plurality of sequentially-adjacent arcuate modules that form a segmented annular band concentric with the tire sidewalls.

The band containing the sequentially-adjacent modules on the outer or curb side sidewall portion preferably has an inner diameter approximately the same as or slightly greater than the line of maximum section width of the tire, with the band then extending in that portion of the sidewall radially outward of the maximum section width, i.e., near the tire shoulder area. The band of sequentially-adjacent modules on the inner or hidden sidewall surface of the tire is preferably located substantially radially inwardly of the maximum section width of the tire, i.e., near the tire bead area.

The modules making up the segmented or discontinuous annular band, on each tire sidewall, may be defined by a pair of spaced parallel circumferential projections connected by angularly spaced substantially radial projections, to therefore form bounded modules or segments of the desired angular extents. The radial projections themselves may take the form of raised ribs or recessed grooves. A further embodiment of this invention envisions that the modules themselves, in their entirety, depend from the bases of the sidewall surfaces, with the modules either being wholly embossed or debossed relative to the bases of the tire sidewall surfaces. If desired, the annular bands themselves or the surfaces adjoining the annular bands may be textured in any known manner so as to visually distinguish the annular band from the adjacent sidewall material.

The use of sequentially-adjacent modules for unified indicia marking, however, does not exclude the use of further indicia markings on other areas of the tire sidewall. In addition, the modules as well as their border projections (if any) and the indicia markings thereon are of the same color as that of the basic tire sidewall.

The preferred location of the modules on the outer sidewall of the tire promotes the maximum legibility of the indicia markings whereas the preferred location of the modules inwardly of the line of maximum tire section width on the remote sidewall of the tire is in accordance with U.S. Department of Transportation requirements and will permit retreading of the tire without loss of the information contained within the modules. These and other features and advantages of the present invention will become more readily understandable by persons skilled in the art when following the presently-preferred best mode description in conjunction with the several drawings.

BRIEF DESCRIPTION OF THE DRAWINGS

FIG. 1 is an elevational view of an article, such as the curb side of a pneumatic tire, illustrating the unified modular indicia marking according to the invention.

FIG. 2 is a fragmentary sectional view, to an enlarged scale, of a tire sidewall cross-section taken substantially on the plane indicated by line 2—2 of FIG. 1.

FIG. 3 is an elevational view, similar to that of FIG. 1, of the other side of a pneumatic tire embodying the unified modular indicia marking of the present invention.

FIG. 4 is a fragmentary sectional view, to an enlarged scale, of a tire sidewall cross-section taken substantially on the plane indicated by line 4—4 of FIG. 3.

BEST MODE FOR CARRYING OUT THE INVENTION

Figure 5:
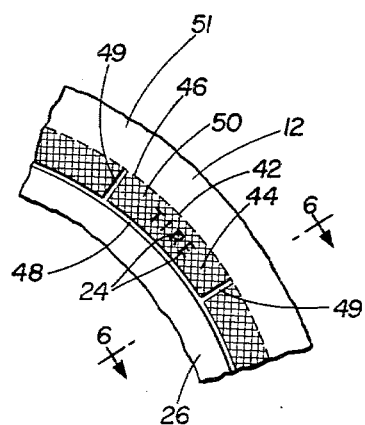
FIG. 5 is a fragmentary elevational view of a portion of an article, such as a sidewall of a pneumatic tire, illustrating another embodiment of the present invention.

FIG. 1 is an elevational view of an article 10 such as the curb side or outer sidewall 12 of a pneumatic tire also having an outer peripheral surface 14, usually in the form of a tire tread surface (not shown), as well as an inner peripheral surface 16 usually in the form of a pair of opposed bead areas 18, best shown in FIG. 2.

FIG. 2, which is a fragmentary sectional view, to an enlarged scale, of the tire sidewall cross-section, shows the contour of the sidewall 12 with line 23 showing the approximate location of the maximum section width of tire 10, whose actual location, of course, varies with the design of the tire itself. The location of this maximum section width is also shown by line 23 in FIG. 1.

FIGS. 3 and 4 are substantially similar to FIGS. 1 and 2 respectively, with the exception that sidewall 40 is the inner or back sidewall opposite to that of outer or curb side sidewall 12 with like parts being denominated with like numerals. Returning now to FIGS. 1 and 2, indicia 24 formed in, on, or depending from base surface 26 of sidewall 12 is contained within at least one of a plurality of multiplicity of sequentially adjacent or successive quadrants, modules or sectors 28. Each arcuate module 28 is located within an annular band or ring 36 defined by a pair of predetermined spaced parallel circumferential projections 30 and 32 with the angular or sector length of each module 28 being defined by a pair of predetermined angularly-spaced substantially radial projections 34 bridging annular band 36 and connecting projections 30 and 32. Thus, each module 28 is bounded on its arcuate sides by sectors of projections 30 and 32 while its ends are bounded by projections 34. These projections may take the form of raised ribs, preferably having a width in the range of about 0.010 to about 0.25 inches.

Each one of the projections or ribs 30, 32 and 34 preferably has the same cross-sectional shape, i.e., width and height, with the radial spacing between circumferential ribs 30 and 32, i.e., the width of band 36, of course being a matter of choice. In addition, the exact number and angular extent of modules 28 will depend on the number and circumferential spacing of radial ribs 34, with the plurality of modules 28, however, always forming a segmented or discontinuous annular band concentric with tire sidewall 12. Modules 28 on curb side sidewall 12 are preferably located outwardly of the line or area 23 of maximum section width of tire 10 in a manner best shown in FIG. 2.

FIGS. 3 and 4 disclose a plurality of modules 38 substantially similar to modules 28 with like parts being similarly denominated. Again, modules 38 serve to bound or limit indicia markings 24, only a few of which are shown. As best seen in FIG. 4, modules 38 are preferably located substantially radially inwardly of the line or area 23 of maximum section width of tire 10. As is the case with modules 28, modules 38 while being formed of sequentially adjacent portions of annular ring 36, may have varying angular or sector extents depending on the number and spacing of projections or ribs 34. Preferably projections 34 are radially disposed but could also have acute or obtuse angles, such as projections 35 in FIG. 3, rather than being perpendicular with circumferential projections 30 and 32, with such angled projections still being considered radially oriented.

Figure 6:
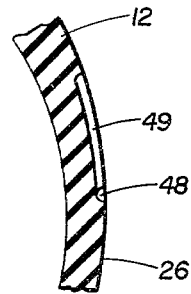
FIG. 6 is a fragmentary sectional view taken substantially on the plane indicated by line 6—6 of FIG. 5.

It should be understood that it is not mandatory that each and every one of modules 28 or 38 contains indicia markings. It should also be understood that the projections 30, 32 and 34 can be debossed instead of embossed, i.e., they could be defined by depending grooves instead of raised annular ribs, although the latter are the now-preferred embodiment. The groove or debossed type of construction is shown in FIGS. 5 and 6 wherein module 50 on tire sidewall 12 is at least partially defined by circumferential groove 48 and radial grooves 49. As further shown in FIGS. 5 and 6, it is also feasible to construct modules defined by substantially radial projections wherein only all of the inner or all of the outer ends of the radial projections 49 are connected to but one of the circumferential projections 48. In such a construction, each module is bounded by a projection in the shape of a sector of a circle and the substantially radial projections extending from the ends of the sector projection as well as an imaginary line 42 (shown as a broken line in FIG. 5) parallel to the circumferential projection (such as 48) and abutting the other ends of the substantially radial projections 49. The resulting module, such as 50 in FIG. 5, preferably has its base surface 44 textured in any desired way to differentiate it from the remainder of the tire sidewall 12. Typical tire sidewall texturing patterns are shown in prior art U.S. Patents Des. No. 122,250; Des. No. 124,204 and Des. No. 207,379, for example. The outer edge 46 of surface 44, which edge is parallel with sector projection 48 and coincident with imaginary line 42, forms the remaining arcuate boundary for each of the modules. In the alternative, the tire sidewall area 51 outside of module 50, specifically on the other side of edge 46, may be textured, instead of surface 44, in order to differentiate it from module 50.

Figure 7:
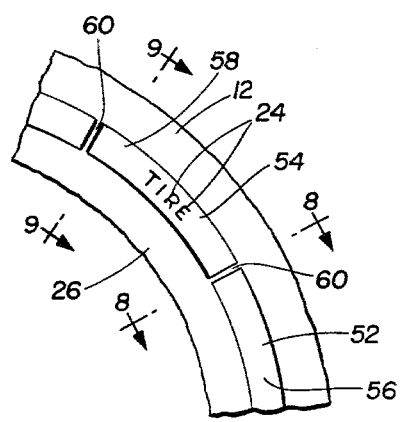
FIG. 7 is a fragmentary elevational view, similar to that of FIG. 5, illustrating yet another embodiment of the present invention.
Figure 8:
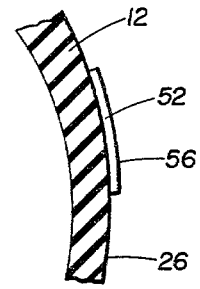
FIG. 8 is a fragmentary sectional view taken substantially on the plane indicated by line 8—8 of FIG. 7.
Figure 9:
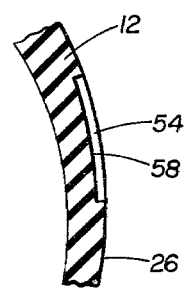
FIG. 9 is a fragmentary sectional view taken substantially on the plane indicated by line 9—9 of FIG. 7.

In the embodiments of FIGS. 1–6 the base surface of the several modules is the base surface 26 of the tire sidewall itself, with the edges of these modules being bounded by embossed or debossed projections, such as ribs or grooves. It is however feasible, as shown in FIGS. 7, 8 and 9 to have the modules themselves embossed, such as 52 in FIGS. 7 and 8, or debossed, such as 54 in FIGS. 7 and 9, relative to the base surface 26 of the sidewalls. Pluralities of modules 52 or 54 however always form a segmented annular band or ring concentric with the tire sidewall. Preferably embossed modules, such as 52, and debossed modules, such as 54, are not intermixed in one annular band. Adjacent ones of segments 52 or 54 are separated via substantially radial strips 60 of sidewall material whose elevation is preferably coincident with and consists of sidewall base surface 26. Indicia markings 24 may be formed in, or depend from, the top surfaces 56, 58 of segments 52, 54 respectively. It should be understood that modules 52, 54 and 50 (FIGS. 5, 6) can be used on either or both the inner and outer sidewall surfaces 12 and 40 respectively.

The use of modules 28 and 38 in addition to permitting the systematic identification of units of information on each tire sidewall also provides a functional advantage during tire manufacturing when projections 30, 32 and 34 are of raised annular rib construction. In order to obtain raised ribs, 30, 32, and 34, the side plate portions of the mold (reference U.S. Pat. No. 3,518,335) must be provided with corresponding recessed grooves. Since venting occurs in a tire mold usually radially inwardly and outwardly from the area of maximum tire section width, the intersecting radial and circumferential mold grooves serve as venting channels that permit trapped gases to escape during the curing cycle. When the radial and circumferential grooves in the molds are then combined with pin vents or micro vents, the normally trapped gases can readily be removed from the tire molds. This combination permits using the minimum number of vents and reduces the usage of these vents in other tire sidewall areas which may be used for decorative purposes.

It should also be understood that the use of sequentially adjacent modules for unified indicia marking does not exclude the addition of further indicia markings on other areas of the tire sidewall. Furthermore, the tire sidewalls may also contain additional sidewall treatments, such as for example annular differing color stripes or raised colored letters concentric with the modules. Preferably the modules and their border projections (if any) as well as the indicia markings thereon are of the same color as that of the basic tire sidewall.

As previously noted, the annular modules on the outer sidewall of the tire, are preferably located at or outwardly of the line or area of maximum tire section width in order to maximize legibility of the indicia markings. The location of the modules radially below or inwardly of the line of maximum tire section width on the inner sidewall of the tire is in accordance with U.S. Department of Transportation requirements and permits retreading of the tire without loss of the information contained within said modules. If so desired, the just-discussed module locations could be reversed, i.e., the modules on the outer sidewall can be located inwardly while the inner sidewall modules can be located outwardly of the line of maximum tire section width. In addition, the modules on both the outer and inner sidewalls of the tire can be located inwardly of the line of maximum tire section width.

The use of indicia markings contained within a plurality of sequentially adjacent modules definitely promotes legibility of the information contained therein which, of course, is beneficial not only to the ultimate consumer but also for inspection, inventory and warehousing purposes. Economic benefits are also obtained by reducing drawing and mold construction times. Furthermore, indicia may be produced more accurately through engraved lettering and in some instances mold venting may also be improved in the manner previously indicated.

From the foregoing description, when read in the light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

What is claimed is:

1. A pneumatic tire having, on the base surfaces of each of its two sidewalls, information-bearing indicia markings contained within several of a plurality of sequentially-adjacent modules, said modules forming a segmented annular band concentric with the tire sidewall, wherein said plurality of sequentially-adjacent modules on one sidewall is located substantially radially inwardly of the maximum section width of said tire and said plurality of modules on the other sidewall is located substantially radially outwardly of said maximum section width.

2. A pneumatic tire according to claim 1 wherein said modules are defined by a pair of spaced parallel circumferential projections, connected by predetermined angularly-spaced radially oriented projections with all of said projections depending from the base surfaces of said sidewalls.

3. A pneumatic tire according to claim 1 wherein each module is bounded on at least one of its arcuate sides by a circumferential projection that bounds one of the inner and outer arcuate surfaces of said band and wherein each module is also bounded by projections abutting and extending, in one radially oriented direction, from said circumferential projection, with all of said projections depending from the base surfaces of said sidewalls.

4. A pneuamtic tire according to claim 1 wherein all of said modules depend from the base surfaces of said sidewalls.

5. A pneumatic tire according to claims 1, 2, 3 or 4 wherein said other sidewall is on the curb side of said tire.

6. A pneumatic tire according to claims 1, 2, 3, or 4 wherein said modules and said indicia markings are of the same color as that of the base surfaces of said tire sidewalls.

7. A pneumatic tire according to claims 2 or 3 wherein said projections are one of raised ribs and recessed grooves.

8. A pneumatic tire according to claims 2 or 3 wherein the cross-sectional shape of each of said circumferential and radially oriented projections is substantially similar.

9. A pneumatic tire according to claim 3 wherein the base surface within said segmented annular band is textured in a manner so as to visually distinguish it from the remainder of said sidewall base surface.

10. A pneumatic tire according to claim 3 wherein the sidewall base surface abutting said annular band on the arcuate side spaced from said circumferential projection is textured in a manner so as to visually distinguish it from the base surface within said annular band.

11. A pneumatic tire according to claim 4 wherein the base surfaces of said modules are embossed relative to the base surfaces of said sidewalls.

12. A pneumatic tire according to claim 4 wherein the base surfaces of said modules are debossed relative to the base surfaces of said sidewalls.

13. A pneumatic tire according to claims 9, 11 or 12 wherein adjacent ones of said modules are separated by substantially radial strips of said sidewall base surfaces.

14. A pneumatic tire according to claim 1 wherein said indicia markings are contained within several of a plurality of successive arcuate segments forming said annular band.

15. A pneumatic tire according to claim 14 wherein said arcuate segments are defined by a pair of spaced parallel circumferential projections connected by predetermined angularly-spaced radial projections.

* * * * *